United States Patent
Mathew et al.

(10) Patent No.: US 7,974,030 B2
(45) Date of Patent: Jul. 5, 2011

(54) SYSTEMS AND METHODS FOR DIBIT CORRECTION

(75) Inventors: George Mathew, San Jose, CA (US); Hongwei Song, Longmont, CO (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 178 days.

(21) Appl. No.: 12/463,626

(22) Filed: May 11, 2009

(65) Prior Publication Data
US 2010/0157458 A1    Jun. 24, 2010

Related U.S. Application Data

(60) Provisional application No. 61/140,254, filed on Dec. 23, 2008.

(51) Int. Cl.
*G11B 20/10* (2006.01)
(52) U.S. Cl. .......................... 360/39; 360/31
(58) Field of Classification Search .................. None
See application file for complete search history.

(56) References Cited

U.S. PATENT DOCUMENTS

| | | | |
|---|---|---|---|
| 5,262,904 A | 11/1993 | Tang et al. | |
| 5,357,520 A | 10/1994 | Arnett et al. | |
| 5,493,454 A | 2/1996 | Ziperovich et al. | |
| 5,517,146 A | 5/1996 | Yamasaki | |
| 5,583,705 A | 12/1996 | Ziperovich et al. | |
| 5,781,358 A | 7/1998 | Hasegawa | |
| 5,872,664 A * | 2/1999 | Meier | 360/31 |
| 5,986,830 A | 11/1999 | Hein | |
| 5,999,355 A | 12/1999 | Behrens et al. | |
| 6,043,942 A | 3/2000 | Cunningham et al. | |
| 6,091,560 A | 7/2000 | Du | |
| 6,130,794 A | 10/2000 | Christensen | |
| 6,134,691 A | 10/2000 | Hirasaka | |
| 6,141,168 A | 10/2000 | Takahashi et al. | |

(Continued)

FOREIGN PATENT DOCUMENTS

GB    2 320 866    6/1997

OTHER PUBLICATIONS

U.S. Appl. No. 12/199,325, filed Aug. 27, 2008, Mathew.

(Continued)

*Primary Examiner* — Jason C Olson
(74) *Attorney, Agent, or Firm* — Hamilton DeSanctis & Cha

(57) ABSTRACT

Various embodiments of the present invention provide systems and methods for providing a corrected dibit signal. As an example, various embodiments of the present invention provide dibit correction circuits. Such dibit correction circuits include a dibit sample buffer, a maximum sample detector circuit, a side sample detector circuit, and a dibit correction circuit. The dibit sample buffer includes a plurality of samples of an uncorrected dibit signal. The maximum sample detector circuit identifies a maximum sample of the plurality of samples of the uncorrected dibit signal, and the side sample detector circuit identifies a first side sample prior to the maximum sample on the uncorrected dibit signal and a second side sample following the maximum sample on the uncorrected dibit signal. The dibit correction circuit applies a correction factor calculated based at least in part on the maximum sample, the first side sample and the second side sample to at least a subset of the plurality of samples of the uncorrected dibit signals to yield a plurality of corrected dibit signals.

20 Claims, 2 Drawing Sheets

U.S. PATENT DOCUMENTS

| | | | |
|---|---|---|---|
| 6,147,828 | A | 11/2000 | Bloodworth et al. |
| 6,181,505 | B1 | 1/2001 | Sacks et al. |
| 6,208,477 | B1 * | 3/2001 | Cloke et al. .............. 360/31 |
| 6,208,481 | B1 | 3/2001 | Spurbeck et al. |
| 6,212,024 | B1 | 4/2001 | Igarashi et al. |
| 6,243,031 | B1 | 6/2001 | Jusuf et al. |
| 6,246,723 | B1 | 6/2001 | Bliss et al. |
| 6,337,778 | B1 | 1/2002 | Gagne |
| 6,396,651 | B1 | 5/2002 | Grover |
| 6,404,572 | B1 | 6/2002 | Hong |
| 6,535,345 | B1 | 3/2003 | Shimoda |
| 6,563,655 | B1 | 5/2003 | Yamasaki et al. |
| 6,621,648 | B2 | 9/2003 | Leigthon et al. |
| 6,662,303 | B1 | 12/2003 | Toosky et al. |
| 6,671,244 | B2 | 12/2003 | Honma |
| 6,674,590 | B2 | 1/2004 | Ottesen et al. |
| 6,678,230 | B2 | 1/2004 | Miyashita et al. |
| 6,721,114 | B1 | 4/2004 | Sutardja et al. |
| 6,788,481 | B2 | 9/2004 | Fang et al. |
| 6,894,854 | B1 | 5/2005 | Carlson et al. |
| 6,912,682 | B1 | 6/2005 | Aoki |
| 6,934,100 | B2 | 8/2005 | Ueno |
| 6,937,415 | B2 | 8/2005 | Galbraith et al. |
| 7,012,772 | B1 | 3/2006 | Vis |
| 7,079,342 | B1 | 7/2006 | Han et al. |
| 7,092,179 | B2 | 8/2006 | Yamanouchi |
| 7,123,429 | B2 | 10/2006 | Musungu et al. |
| 7,126,773 | B1 | 10/2006 | Taratorin |
| 7,170,704 | B2 * | 1/2007 | DeGroat et al. .............. 360/53 |
| 7,193,802 | B2 | 3/2007 | Cideciyan et al. |
| 7,248,424 | B2 | 7/2007 | Ueno |
| 7,256,954 | B2 | 8/2007 | Serizawa |
| 7,262,928 | B1 | 8/2007 | Oberg |
| 7,271,753 | B1 | 9/2007 | Padukone et al. |
| 7,308,057 | B1 | 12/2007 | Patapoutian |
| 7,440,224 | B2 | 10/2008 | Ehrlich et al. |
| 7,495,854 | B2 | 2/2009 | Hutchins |
| 7,542,227 | B2 | 6/2009 | Che et al. |
| 7,715,135 | B1 | 5/2010 | Sutardja et al. |
| 7,733,591 | B2 | 6/2010 | Bottemiller et al. |
| 2002/0159350 | A1 | 10/2002 | Ogura et al. |
| 2003/0026354 | A1 | 2/2003 | Chang et al. |
| 2003/0048564 | A1 | 3/2003 | Koller et al. |
| 2005/0117243 | A1 | 6/2005 | Serizawa et al. |
| 2006/0061496 | A1 | 3/2006 | Stein et al. |
| 2006/0062125 | A1 | 3/2006 | Horie et al. |
| 2006/0176947 | A1 | 8/2006 | Lim |
| 2007/0041115 | A1 | 2/2007 | Lee |
| 2007/0047120 | A1 | 3/2007 | DeGroat |
| 2007/0076313 | A1 | 4/2007 | Hutchins et al. |
| 2007/0140088 | A1 | 6/2007 | Hino et al. |
| 2008/0031114 | A1 | 2/2008 | Hong et al. |
| 2008/0037153 | A1 | 2/2008 | Yoshizawa |
| 2008/0081382 | A1 | 4/2008 | Mathew |
| 2009/0230639 | A1 | 9/2009 | Liu |

OTHER PUBLICATIONS

U.S. Appl. No. 12/273,265, filed Nov. 18, 2008, Mathew.
U.S. Appl. No. 12/337,775, filed Dec. 18, 2008, Mathew.
U.S. Appl. No. 12/337,805, filed Dec. 18, 2008, Mueller.
U.S. Appl. No. 12/337,828, filed Dec. 18, 2008, Mueller.
U.S. Appl. No. 12/348,236, filed Jan. 2, 2009, Liu.
U.S. Appl. No. 12/337,850, filed Dec. 18, 2008, Mueller.
U.S. Appl. No. 12/371,906, filed Feb. 16, 2009, Ratnakar Aravind.
U.S. Appl. No. 12/430,948, filed Apr. 28, 2009, Grundvig.
Cho and Lee, "An Estimation Technique for Nonlinear Distortion in High Density Magnetic Recording Channels", IEEE Transactions on Magnetics, vol. 34, No. 1, pp. 40-44 Jan. 1998.
Degroat et al., "Experimental Characterization of Media Noise Based on Equalized Synchronized Drive Data", IEEE Trans. Magnetics, vol. 37, No. 2, pp. 633-638, Mar. 2001.
Farhang-Boroujeny, Adaptive Filters: Theory and Applications. John Wiley & Sons Ltd, 1998, Chapter 11. pp. 373-379.
Kavcic and Patapoutian, "A Signal-Dependent Autoregressive Channel Model", IEEE Trans. Magnetics, vol. 35 No. 5, pp. 2316-2318, Sep. 1999.
Lin et al. "An estimation technique for accurately modelling the magnetic recording channel including nonlinearities." IEEE Trans. Mag, vol. 25, No. 5, pp. 4084-4086, Sep. 89.
Moon, J., "Signal-to-Noise Ratio Definition for Magnetic Recording Channels With Transition Noise", IEEE Trans. Magnetics, vol. 36, No. 5, pp. 3881-3883, Sep. 2000.
Palmer et al, "Identification of nonlinear write effects using pseudorandom sequences" IEEE Trans. Magnetics, vol. 23 No. 5, pp. 2377-2379, Sep. 1987.
Partovi; et al., "Flow-Through Latch and Edge-Triggered Flip-Flop Hybrid Elements"; Feb. 8, 1996; pp. 138-139; Solid-State Circuits Conf Digest of Technical Papers IEEE.
Tokumasu et al. "A New Reduced Clock-Swing Flip-Flop (NDKFF)," Corporate Research & Development Center, Toshiba Corporation. IEEE Feb. 2002 Custom Intergrated Circuits Conf.
Wood and Donaldson, "The Helical-Scan Magnetic Tape Recorder as a Digital Communication Channel", IEEE Transactions on Magnetics, vol. MAG-15, No. 2, pp. 935-943 Mar. 1979.

* cited by examiner

SYSTEMS AND METHODS FOR DIBIT CORRECTION

CROSS REFERENCE TO RELATED APPLICATIONS

The present application claims priority to (is a non-provisional of) U.S. Prov. Pat. App. No. 61/140,254 entitled "Post Processing for an Extracted dibit" and filed Dec. 23, 2008 by Mathew et al. The entirety of the aforementioned provisional patent application is incorporated herein by reference for all purposes.

BACKGROUND OF THE INVENTION

The present inventions are related to systems and methods for preparing dibit signals that may be used for estimating non-linear parameters, and more particularly, to systems and methods for correcting a dibit signal to remove DC offset and/or restore the baseline.

Dibit signals are used in a variety of processing scenarios. For example, a dibit signal may be used to estimate a variety of non-linear parameters in a hard disk drive system utilizing longitudinal or perpendicular recording approaches. Such non-linear parameters include non-linear transition shifts, magneto-resistive asymmetry, channel linear density, overwrite, and the like. These parameters help to understand the types and strengths of nonlinear distortions present in the recording channel and also for developing approaches for mitigating these distortions. Thus, dibit extraction circuits may be included in a variety of circuits. However, it is often difficult to use such extracted dibit signals due to DC offset or distorted baseline exhibited in the dibit signal. This DC offset is caused by the non-zero cross-correlation property of the pseudo-random bit sequence (PRBS) used for extracting the dibit in conjunction with the non-zero DC property of the recording channel. This DC offset issue is more serious in perpendicular recording, as compared to longitudinal recording. FIG. 1 shows an exemplary prior art dibit signal 100. Dibit signal 100 includes a main lobe 110 with a number of echoes 130 disposed on either side of main lobe 110. As shown, main lobe 110 exhibits a magnitude significantly larger than any of echoes 130. As shown, a DC offset 120 may be so great that dibit signal 100 may be unusable.

Some approaches rely on a high pass filter present in the analog front end (i.e., AC-coupling) to remove the DC offset. However, in many cases, the pole of the high pass filter is very narrow and focused on removing only the DC frequency data. Because the pole is so narrow, there is often a transient affect that results in an undesired modification to the dibit signal while not solving the DC offset problem. Where the pole is made broader, too much information is removed from the dibit signal. Other approaches use a non-echo region (i.e., a flat region of the dibit signal) to estimate the DC offset. This estimated DC offset is then added/subtracted from the entire dibit signal. This approach does not work well, however, because the non-echo region is generally not perfectly flat due to AC coupling and presence of echoes. Other approaches perform dibit correction where the post process bits are represented by the following equations:

$$h_b[k] = \left(p[k] - \frac{1}{N}\sum_l p[l]\right)\frac{N}{N+1},$$

for DC-free channel; and $$h_b[k] = \left(p[k] + \sum_l p[l]\right)\frac{N}{N+1},$$

for channels with DC.

Such approaches provide accurate correction of the dibit signal only where no non-linear distortions or distortion from AC coupling are present.

Hence, for at least the aforementioned reasons, there exists a need in the art for advanced systems and methods for correcting dibit signals.

BRIEF SUMMARY OF THE INVENTION

The present inventions are related to systems and methods for preparing dibit signals that may be used for estimating non-linear parameters, and more particularly, to systems and methods for correcting a dibit signal to remove DC offset and/or restore the baseline.

Various embodiments of the present invention provide dibit correction circuits. Such dibit correction circuits include a dibit sample buffer, a maximum sample detector circuit, a side sample detector circuit, and a dibit correction circuit. The dibit sample buffer includes a plurality of samples of an uncorrected dibit signal. The maximum sample detector circuit identifies a maximum sample of the plurality of samples of the uncorrected dibit signal, and the side sample detector circuit identifies a first side sample prior to the maximum sample on the uncorrected dibit signal and a second side sample following the maximum sample on the uncorrected dibit signal. In some cases, the maximum sample, the first side sample and the second side sample are all non-zero values on the main lobe. The dibit correction circuit applies a correction factor calculated based at least in part on the maximum sample, the first side sample and the second side sample to at least a subset of the plurality of samples of the uncorrected dibit signals to yield a plurality of corrected dibit signals. In some instances of the aforementioned embodiments, the circuits further include a corrected dibit buffer that stores the plurality of corrected dibit signals.

In some instances of the aforementioned embodiments, the maximum sample corresponds to the center of a main lobe of the uncorrected dibit signal. In particular cases, the first side sample is the sample on the main lobe directly preceding the maximum sample, and the second side sample is the sample on the main lobe directly succeeding the maximum sample. It should be noted that more than a single side sample on either side of the maximum sample may be detected by the side sample detector circuit.

In various instances of the aforementioned embodiments, the dibit correction circuit includes a correction calculation circuit and a correction application circuit. In particular cases, the correction calculation circuit calculates a correction factor in accordance with the following equation:

$$\text{correction factor} = \frac{1}{N-2n}\sum_{i=-n}^{n} p[k_0 + i],$$

where N is the length of the pseudo-random bit sequence, where $p[k_0+i]$ represents individual samples of the uncorrected dibit signal from the dibit sample buffer, where $i=-1$ corresponds to the first side sample, where $i=1$ corresponds to the second side sample, where $i=0$ corresponds to the maximum sample, and where n defines the number of samples that make up a main lobe of the uncorrected dibit signal. In some instances, the correction application circuit augments each sample of the uncorrected dibit signal with the correction factor to yield an augmented dibit signal. In some such cases, the augmented dibit signal is multiplied by a derivation factor to yield a plurality of corrected dibit samples. The plurality of corrected dibit signals are calculated in accordance with the following equation:

$$\left[ p[m] + \frac{1}{N-2n} \sum_{i=-n}^{n} p[k_0 + i] \right] \frac{N}{N+1},$$

wherein p[m] represents respective uncorrected dibit signal values, and m is an index with a maximum value corresponding to the number of the plurality of samples of the uncorrected dibit signal.

Other embodiments of the present invention provide methods for correcting a dibit signal. The methods include providing a plurality of sample values corresponding to an uncorrected dibit signal; identifying a maximum sample from the plurality of samples; identifying a first side sample and a second side sample. The first side sample precedes the maximum sample in the plurality of sample values, and the second side sample follows the maximum sample in the plurality of sample values. The methods further include calculating a correction factor using at least the maximum sample, the first side sample and the second side sample.

In some instances of the aforementioned embodiments, the plurality of sample values is a first plurality of sample values, and the methods further include applying the correction factor to each of the first plurality of samples to yield a second plurality of samples corresponding to a corrected dibit signal. In some cases, the methods further include storing the second plurality of samples.

Applying the correction factor may include adding the correction factor to each of the first plurality of samples to yields a plurality of sums, and multiplying each of the plurality of sums by a derivation factor. The plurality of corrected dibit signals may be calculated in accordance with the following equation:

$$\left[ p[m] + \frac{1}{N-2n} \sum_{i=-n}^{n} p[k_0 + i] \right] \frac{N}{N+1},$$

where N is the length of the pseudo-random bit sequence, where $p[k_0+i]$ represents individual samples of the uncorrected dibit signal from the dibit sample buffer, where i=−1 corresponds to the first side sample, where i=1 corresponds to the second side sample, where i=0 corresponds to the maximum sample, where n defines the number of samples that make up a main lobe of the uncorrected dibit signal, where p[m] represents respective ones of the first plurality of samples, and where m is an index with a maximum value corresponding to the number of the first plurality of samples.

Yet other embodiments of the present invention provide dibit correction systems. Such systems include a maximum sample detector circuit, a side sample detector circuit, and a dibit correction circuit. The maximum sample detector circuit identifies a maximum sample from a plurality of samples of an uncorrected dibit signal. The side sample detector circuit identifies a first side sample prior to the maximum sample on the uncorrected dibit signal and a second side sample preceding the first side sample on the uncorrected dibit signal. The dibit correction circuit applies a correction factor calculated based at least in part on the maximum sample, the first side sample and the second side sample to at least a subset of the plurality of samples of the uncorrected dibit signals to yield a plurality of corrected dibit signals.

In some instances of the aforementioned embodiments, the maximum sample corresponds to the center of a main lobe of the uncorrected dibit signal. In particular cases, the first side sample is the sample on the main lobe directly preceding the maximum sample, and the second side sample is the sample on the main lobe directly preceding the first side sample. In various instances of the aforementioned embodiments, the dibit correction circuit includes a correction calculation circuit and a correction application circuit. The correction application circuit augments each sample of the uncorrected dibit signal with a correction factor to yield an augmented dibit signal, and the augmented dibit signal is multiplied by a derivation factor to yield a plurality of corrected dibit samples.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
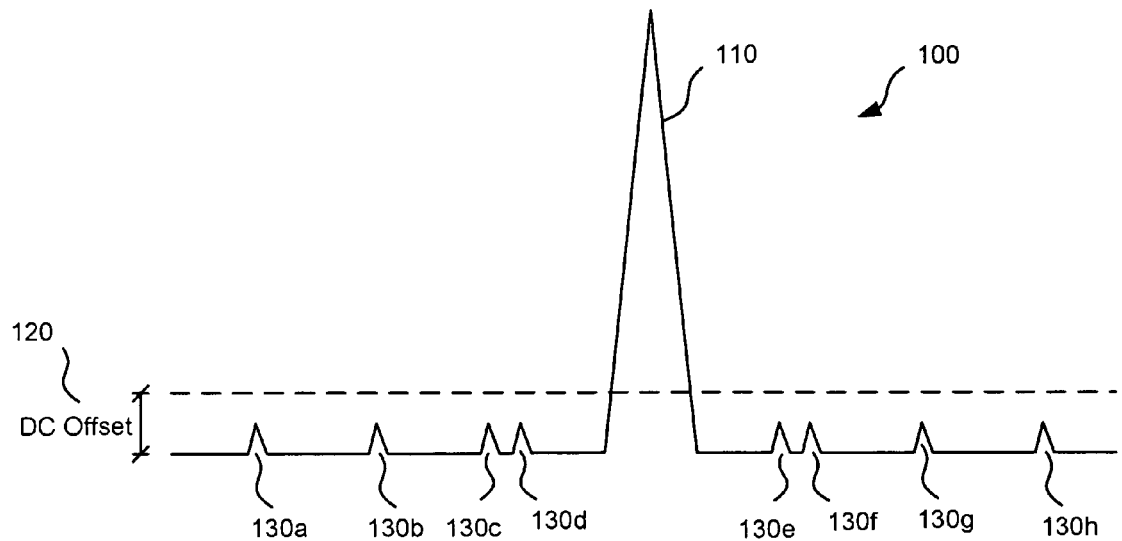
FIG. 1 depicts a prior art dibit signal exhibiting a DC offset or distorted baseline rendering the dibit less accurate to use.

The present inventions are related to systems and methods for preparing dibit signals that may be used for estimating non-linear parameters, and more particularly, to systems and methods for correcting a dibit signal to remove DC offset and/or restore the baseline.

Various embodiments of the present invention provide advanced systems and methods for correcting a dibit signal that work even when non-linear channel distortions and/or AC coupling exist. The correction effectively removes DC offset at discrete time points and restores the baseline whether or not non-linear transition shifts and/or distortion from AC coupling is evident. This results in a corrected dibit signal that accurately represents the uncorrected dibit without the DC offset. Various embodiments of the present invention recognize that the echoes present in the dibit signal are not free of DC offset, that AC coupling can result in varying baseline in the dibit signal, and that the main lobe of the dibit is typically short (i.e., two to five coefficients). The magnitude of these coefficients is generally larger than the amplitude of the echoes.

Such a corrected dibit may be used for a number of purposes including, but not limited to, estimation of linear recording density, non-linear transition shifts due to data transitions present earlier in a sequential stream, magneto-resistive head asymmetry, and overwrite effects (i.e., the effects of previously recorded data on later recoded data). Accurate estimation of these parameters aid in understanding the quality of a read/write head assembly and allows for optimization of circuits and/or algorithms used in read-path and write-path circuitry intended for storage applications, devices and/or systems. Based upon the disclosure provided herein, one of ordinary skill in the art will recognize a variety of other advantages that may be achieved through use of one or more embodiments of the present invention.

As a starting point, the linear readback signal may be represented as:

$$z_0[n] = \sum_k a[k] h_b[n-k],$$

where $h_b[k]$ is the true bit response. By using the correlation property of pseudo-random bit sequences of length N, the uncorrected, extracted dibit can be expressed as:

$$p[m] = h_b[m] - \frac{1}{N} \sum_{k \neq m} h_b[k] =$$

$$= \frac{N+1}{N} h_b[m] - \frac{1}{N} \sum_k h_b[k] \Rightarrow \sum_m p[m]$$

$$= \frac{N+1}{N} h_b[m] - \sum_m h_b[k]$$

$$= \frac{1}{N} \sum_m h_b[m].$$

Let the non-negligible values in the true bit-response (i.e., the bit response that would be expected after post processing correction) be $h_b[k]$ for $k=-M_1, -M_1+1, \ldots, M_2$, where $M_1$ and $M_2$ are integers corresponding to sample points on the main lobe of the dibit. From this, the extracted dibit signal can be expressed as:

$$p[m] = \frac{N+1}{N} h_b[m] - \frac{1}{N} \sum_{k=-M_1}^{M_2} h_b[k], \text{ for } m \in \{-M_1, -M_1+1, \ldots, M_2\}$$

$$p[m] = -\frac{1}{N} \sum_{k=-M_1}^{M_2} h_b[k], \text{ for } m \notin \{-M_1, -M_1+1, \ldots, M_2\}.$$

The following can be derived from the aforementioned equations:

$$\sum_{m=M_1}^{M2} p[m] = \frac{N - M_2 - M_1}{N} \sum_{k=-M_1}^{M2} h_b[k]$$

$$= \frac{1}{N} \sum_k h_b[k] = \frac{1}{N} \sum_{k=-M_1}^{M2} h_b[k]$$

-continued $$= \frac{1}{N - M_2 - M_1} \sum_{k=-M_1}^{M2} p[m]$$

From this, the post processed dibit signal (i.e., the corrected dibit signal) maybe described by the following equation:

$$h_b[m] = \left( p[m] + \frac{1}{N} \sum_k h_b[k] \right) \frac{N}{N+1}$$

$$= \left( p[m] + \frac{1}{N} \sum_{k=-M_1}^{M2} h_b[k] \right) \frac{N}{N+1}$$

$$\Rightarrow \left( p[m] + \frac{1}{N - M_1 - M_2} \sum_{m=-M_1}^{M2} p[m] \right) \frac{N}{N+1}.$$

where if $M_2$ and $M_1$ are the same magnitude, M, the equation can be reduced to:

$$h_b[m] = \left( p[m] + \frac{1}{N - 2M} \sum_{m=-M}^{M} p[m] \right) \frac{N}{N+1}.$$

Various embodiments of the present invention provide circuitry capable of implementing the above mentioned equations. In some cases, the circuitry provides a dibit correction factor that is added to an uncorrected dibit resulting in a circuit providing a corrected result consistent with the above mentioned equations.

Figure 2:
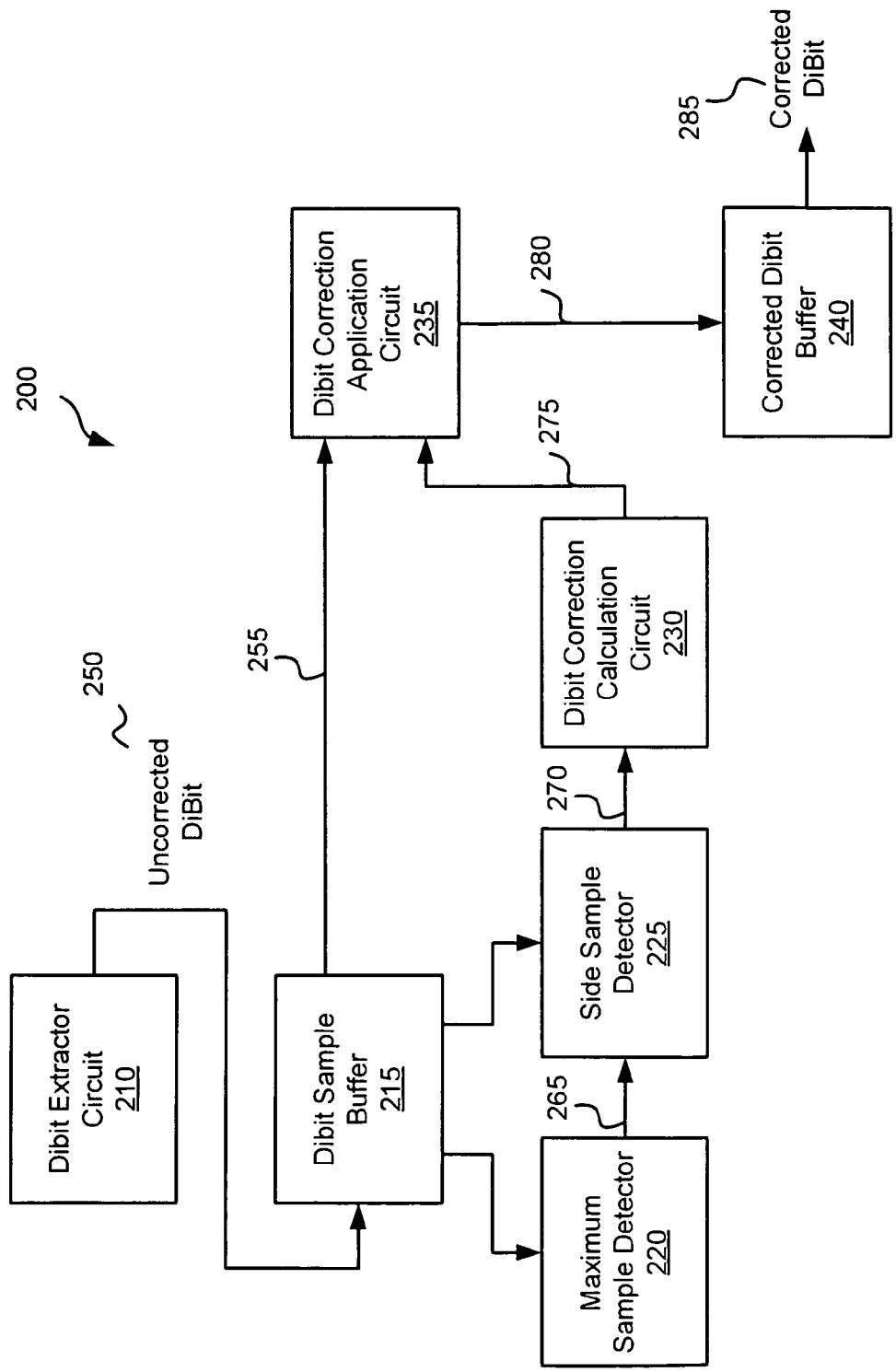
FIG. 2 shows a dibit correction circuit in accordance with various embodiments of the present invention.

Turning to FIG. 2, a dibit correction circuit 200 is shown in accordance with various embodiments of the present invention. Dibit correction circuit 200 includes a dibit extractor circuit 210. Dibit extractor circuit 210 may be any circuit known in the art that is capable of extracting a dibit signal. In this case, the dibit signal is an uncorrected dibit signal 250 that may exhibit a DC offset or a distorted baseline similar to that described above in relation to FIG. 1. Uncorrected dibit signal 250 is provided to a dibit sample buffer circuit 215 for storing the sampled of uncorrected dibit signal 250.

A maximum sample detector circuit 220 is operable to access at least a portion of the samples from dibit sample buffer circuit 215 and from those samples to identify the main lobe of uncorrected dibit signal 250. The main lobe is identified as being associated with the highest value sample from dibit sample buffer circuit 215. In one embodiment of the present invention, the position of the main lobe is centered around the position of the largest sample from dibit sample buffer 215. The following pseudocode describes the process of identifying the main lobe:

/*Initialize the sample storage to zero, and find location of main lobe*/
Max Sample Value = 0;
For (Count == first to Count == last){
    If (Sample(Count)>Max Sample Value){
        Max Sample Value = Sample(Count);
        Main Lobe Location = Location of Sample(Count)
    }
}

The identified main lobe location is referred to herein as $k_0$ and is provided to a side sample detector circuit 225 as an output 265. Based upon the disclosure provided herein, one of ordinary skill in the art will recognize other approaches that may be used for identifying the location of the main lobe from samples received from dibit sample buffer 215.

Side sample detector circuit 225 is operable to access at least a portion of the samples from dibit sample buffer circuit 215 and from those samples to identify one or more samples of the main lobe on either side of $k_0$. The following pseudocode describes the process of identifying n samples of the main lobe on either side of $k_0$:

```
/*Find n-samples prior to k₀ and n-samples after k₀*/
For (Count = -n to Count = n){
    Side Sample(count) = Sample(Main Lobe Location + Count);
}
```

The side samples are described using the notation ($k_0$+instance) with the value of 'instance' identifying a relative placement from the main lobe. Thus, for example, $k_0$−1 is the location of the sample on the main lobe immediately preceding the maximum sample, and $k_0$+1 is the location of the sample on the main lobe immediately following the maximum sample. Expanding upon this, $k_0$−2 is the location of the sample on the main lobe immediately preceding the $k_0$−1 sample, and $k_0$+2 is the location of the sample on the main lobe immediately following the $k_0$+1 sample. Based upon the disclosure provided herein, one of ordinary skill in the art will recognize other approaches that may be used for identifying the location of the side samples received from dibit sample buffer 215.

The location of the central point of the main lobe ($k_0$) and the location of the identified side samples ( . . . $k_0$−2, $k_0$−1, $k_0$+1, $k_0$+2, . . . ) are provided as an output 270 to a dibit correction calculation circuit 230. Correction calculation circuit 230 calculates a correction factor based upon the sample values corresponding to the identified locations in output 270 (i.e., . . . $k_0$−2, $k_0$−1, $k_0$+1, $k_0$+2, . . . ). In particular, the correction factor may be calculated in accordance with the following equation:

$$\text{correction factor} = \frac{1}{N-2n} \sum_{i=-n}^{n} p[k_0 + i],$$

where N is the length of the pseudo-random bit sequence that is used for the correlation, where $p[k_0+i]$ represents individual samples of the uncorrected dibit signal around the main lobe with $p[k_0]$ being the center point and indexed points (i) extending around that point, and where n defines the number of samples that make up the main lobe.

The correction factor is provided as an output 275 to a dibit correction application circuit 235. Dibit correction application circuit 235 adds the correction factor to uncorrected dibit signal 250 to yield the following result:

$$\text{partial corrected } dibit[m] = p(m) + \frac{1}{N-2n} \sum_{i=-n}^{n} p[k_0 + i].$$

The above mentioned partial corrected dibit signal is multiplied by a derivation value $$\left(\frac{N}{N+1}\right)$$

yielding a result corresponding to the following equation:

$$h_b[m] = \left[ p[m] + \frac{1}{N-2n} \sum_{i=-n}^{n} p[k_0 + i] \right] \frac{N}{N+1},$$

where p[m] represents the respective uncorrected dibit signal values 255 from dibit sample buffer 215. This result is provided as an output 280 to a corrected dibit buffer 240. Corrected dibit buffer 240 may be accessed to yield a corrected dibit signal 285 for use in one or more other functions and/or processes. Said another way, the values maintained in dibit buffer 240 are the values originally contained in dibit sample buffer 215 that are respectively offset by the correction factor, and the sum multiplied by the derivation value. Corrected dibit buffer 240 may be any media capable of storing the dibit information. Thus, as some examples, corrected dibit buffer 240 may be a static random access memory, a register memory, or the like. Based upon the disclosure provided herein, one of ordinary skill in the art will recognize a variety of storage media that may be used to implement corrected dibit buffer 240 in accordance with one or more embodiments of the present invention.

Figure 3:
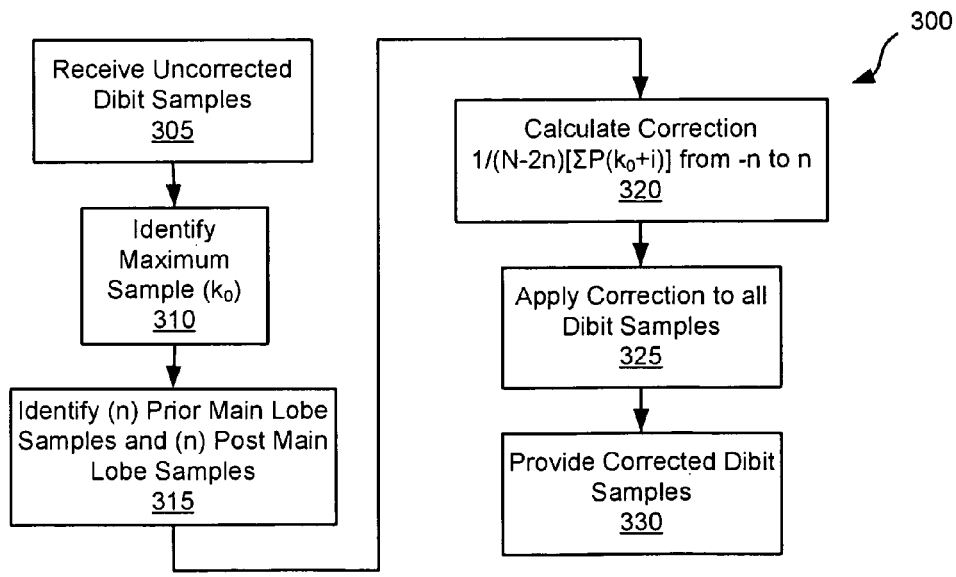
FIG. 3 is a flow diagram showing a method in accordance with one or more embodiments of the present invention for dibit correction.

Turning to FIG. 3, a flow diagram 300 shows a method in accordance with one or more embodiments of the present invention for dibit correction. Following flow diagram 300, a set of uncorrected dibit samples are received (block 305). The set of uncorrected dibit samples may be received from, for example, a dibit extractor circuit as are known in the art. The uncorrected dibit samples may correspond to a dibit signal that exhibits an undesired DC offset or distorted baseline. The set of dibit samples are queried to determine a maximum sample (block 310). This maximum dibit sample corresponds to the center of the main lobe of the uncorrected dibit signal. In some embodiments of the present invention, the main lobe is identified by a circuit that performs the function described by the following pseudocode:

```
/*Initialize the sample storage to zero, and find location of main lobe*/
Max Sample Value = 0;
For (Count == first to Count == last){
    If (Sample(Count)>Max Sample Value){
        Max Sample Value = Sample(Count);
        Main Lobe Location = Location of Sample(Count)
    }
}
```

The identified main lobe center location is referred to herein as $k_0$.

In addition, n prior side samples of the main lobe and n post side samples of the main lobe are identified (block 315). In some embodiments of the present invention, the side samples are identified by a circuit that performs the function described by the following pseudocode:

```
/*Find n-samples prior to k₀ and n-samples after k₀*/
For (Count = -n to Count = n){
    Side Sample(count) = Sample(Main Lobe Location + Count);
}
```

The side samples are identified by the notation ($k_0$+instance) with the value of 'instance' identifying a relative placement from the center of the main lobe ($k_0$). Thus, for example, $k_0-1$ is the location of the sample on the main lobe immediately preceding the maximum sample, and $k_0+1$ is the location of the sample on the main lobe immediately following the maximum sample. Expanding upon this, $k_0-2$ is the location of the sample on the main lobe immediately preceding the $k_0-1$ sample, and $k_0+2$ is the location of the sample on the main lobe immediately following the $k_0+1$ sample. In some cases the number of samples prior to the center point of the main lobe is different than the number of samples following the center point of the main lobe. In other cases, the same number of side samples on either side of the main lobe are used.

The identified center point of the main lobe and the side samples are used to calculate a correction factor (block 320). In some embodiments of the present invention, the correction factor may be determined using a circuit that performs the following calculation:

$$\text{correction factor} = \frac{1}{N-2n}\sum_{i=-n}^{n} p[k_0+i],$$

where N is the length of the pseudo-random bit sequence that is used for the correlation, where $p[k_0+i]$ represents individual samples of the uncorrected dibit signal around the main lobe with $p[k_0]$ being the center point and indexed points (i) extending around that point, and where n defines the number of samples that make up the main lobe.

This correction factor is then applied to each of the respective uncorrected dibit samples resulting in a number of corrected dibit samples (block 325). In one particular embodiment of the present invention, application of the correction factor to yield the corrected dibit signals is done in accordance with the following equation:

$$\text{corrected } dibit \text{ samples}[m] = \left[ p[m] + \frac{1}{N-2n}\sum_{i=-n}^{n} p[k_0+i] \right] \frac{N}{N+1},$$

where p[m] represents the respective uncorrected dibit signal values. The resulting corrected dibit samples are then provided as an output (block 330).

In conclusion, the invention provides novel systems, devices, methods and arrangements for correcting dibit signals. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A dibit correction circuit, the circuit comprising:
   a dibit sample buffer, wherein the dibit sample buffer is operable to store a plurality of samples of an uncorrected dibit signal;
   a maximum sample detector circuit, wherein the maximum sample detector circuit is operable to identify a maximum sample of the plurality of samples of the uncorrected dibit signal;
   a side sample detector circuit, wherein the side sample detector circuit is operable to identify a first side sample prior to the maximum sample on the uncorrected dibit signal and a second side sample following the maximum sample on the uncorrected dibit signal; and
   a dibit correction circuit, wherein the dibit correction circuit is operable to apply a correction factor calculated based at least in part on the maximum sample, the first side sample and the second side sample to at least a subset of the plurality of samples of the uncorrected dibit signals to yield a plurality of corrected dibit signals.

2. The dibit correction circuit of claim 1, wherein the maximum sample corresponds to the center of a main lobe of the uncorrected dibit signal.

3. The dibit correction circuit of claim 2, wherein the first side sample is the sample on the main lobe directly preceding the maximum sample, and wherein the second side sample is the sample on the main lobe directly succeeding the maximum sample.

4. The dibit correction circuit of claim 1, wherein the dibit correction circuit includes a correction calculation circuit and a correction application circuit.

5. The dibit correction circuit of claim 4, wherein the correction calculation circuit is operable to calculate a correction factor in accordance with the following equation:

$$\text{correction factor} = \frac{1}{N-2n}\sum_{i=-n}^{n} p[k_0+i],$$

wherein N is the length of the pseudo-random bit sequence, wherein $p[k0+i]$ represents individual samples of the uncorrected dibit signal from the dibit sample buffer, wherein i=−1 corresponds to the first side sample, wherein i=1 corresponds to the second side sample, wherein i=0 corresponds to the maximum sample, and wherein n defines the number of samples that make up a main lobe of the uncorrected dibit signal.

6. The dibit correction circuit of claim 5, wherein the correction application circuit is operable to augment each sample of the uncorrected dibit signal with the correction factor to yield an augmented dibit signal.

7. The dibit correction circuit of claim 6, wherein the augmented dibit signal is multiplied by a derivation factor to yield a plurality of corrected dibit samples.

8. The dibit correction circuit of claim 7, wherein the plurality of corrected dibit signals are calculated in accordance with the following equation:

$$\left[ p[m] + \frac{1}{N-2n}\sum_{i=-n}^{n} p[k_0+i] \right] \frac{N}{N+1},$$

wherein p[m] represents respective uncorrected dibit signal values, and m is an index with a maximum value corresponding to the number of the plurality of samples of the uncorrected dibit signal.

9. The dibit correction circuit of claim 1, wherein the circuit further comprises:
   a corrected dibit buffer, wherein the corrected dibit buffer is operable to store the plurality of corrected dibit signals.

10. A method for correcting a dibit signal, the method comprising:
   providing a plurality of sample values corresponding to an uncorrected dibit signal;
   identifying a maximum sample from the plurality of samples;

identifying a first side sample, wherein the first side sample precedes the maximum sample in the plurality of sample values;

identifying a second side sample, wherein the second side sample follows the maximum sample in the plurality of sample values; and calculating a correction factor, wherein the correction factor is calculated using at least the maximum sample, the first side sample and the second side sample.

11. The method of claim 10, wherein the plurality of sample values is a first plurality of sample values, and wherein the method further comprises:

applying the correction factor to each of the first plurality of samples to yield a second plurality of samples corresponding to a corrected dibit signal.

12. The method of claim 11, wherein applying the correction factor includes adding the correction factor to each of the first plurality of samples to yields a plurality of sums, and multiplying each of the plurality of sums by a derivation factor.

13. The method of claim 12, wherein the plurality of corrected dibit signals are calculated in accordance with the following equation:

$$\left[ p[m] + \frac{1}{N-2n} \sum_{i=-n}^{n} p[k_0 + i] \right] \frac{N}{N+1},$$

wherein N is the length of the pseudo-random bit sequence, wherein $p[k_0+i]$ represents individual samples of the uncorrected dibit signal from the dibit sample buffer, wherein $i=-1$ corresponds to the first side sample, wherein $i=1$ corresponds to the second side sample, wherein $i=0$ corresponds to the maximum sample, wherein n defines the number of samples that make up a main lobe of the uncorrected dibit signal, and wherein $p[m]$ represents respective ones of the first plurality of samples, and wherein m is an index with a maximum value corresponding to the number of the first plurality of samples.

14. The method of claim 11, wherein the method further comprises:

storing the second plurality of samples.

15. A dibit correction system, the system comprising:

a maximum sample detector circuit, wherein the maximum sample detector circuit identifies a maximum sample from a plurality of samples of an uncorrected dibit signal;

a side sample detector circuit, wherein the side sample detector circuit identifies a first side sample prior to the maximum sample on the uncorrected dibit signal and a second side sample preceding the first side sample on the uncorrected dibit signal; and a dibit correction circuit, wherein the dibit correction circuit applies a correction factor calculated based at least in part on the maximum sample, the first side sample and the second side sample to at least a subset of the plurality of samples of the uncorrected dibit signals to yield a plurality of corrected dibit signals.

16. The dibit correction system of claim 15, wherein the maximum sample corresponds to the center of a main lobe of the uncorrected dibit signal.

17. The dibit correction system of claim 16, wherein the first side sample is the sample on the main lobe directly preceding the maximum sample, and wherein the second side sample is the sample on the main lobe directly preceding the first side sample.

18. The dibit correction system of claim 15, wherein the dibit correction circuit includes a correction calculation circuit and a correction application circuit.

19. The dibit correction system of claim 18, wherein the correction application circuit augments each sample of the uncorrected dibit signal with a correction factor to yield an augmented dibit signal, and wherein the augmented dibit signal is multiplied by a derivation factor to yield a plurality of corrected dibit samples.

20. The dibit correction system of claim 19, wherein the correction calculation circuit calculates a correction factor in accordance with the following equation:

$$\text{correction factor} = \frac{1}{N-2n} \sum_{i=-n}^{n} p[k_0 + i];$$

and wherein the plurality of corrected dibit signals are calculated in accordance with the following equation:

$$\left[ p[m] + \frac{1}{N-2n} \sum_{i=-n}^{n} p[k_0 + i] \right] \frac{N}{N+1},$$

wherein N is the length of the pseudo-random bit sequence, wherein $p[k_0+i]$ represents individual samples of the uncorrected dibit signal from the dibit sample buffer, wherein $i=-1$ corresponds to the first side sample, wherein $i=1$ corresponds to the second side sample, wherein $i=0$ corresponds to the maximum sample, wherein n defines the number of samples that make up a main lobe of the uncorrected dibit signal, wherein $p[m]$ represents respective uncorrected dibit signal values, and wherein m is an index with a maximum value corresponding to the number of the plurality of samples of the uncorrected dibit signal.

* * * * *